United States Patent [19]
Allred, Jr.

[11] Patent Number: 5,705,121
[45] Date of Patent: Jan. 6, 1998

[54] METHOD FOR BACK-TO-BACK BLOW MOLDING OF HOLLOW BODIES

[76] Inventor: John F. Allred, Jr., 2100 Graywalsh Dr., Wilmington, N.C. 28405

[21] Appl. No.: 417,803

[22] Filed: Apr. 6, 1995

Related U.S. Application Data

[62] Division of Ser. No. 252,685, Jun. 6, 1994, Pat. No. 5,551,862.

[51] Int. Cl.⁶ .......................... B29C 49/04; B29C 49/36; B29C 49/56
[52] U.S. Cl. .......................... 264/543; 264/540
[58] Field of Search .......................... 264/523, 537, 264/538, 540, 542, 543, 40.5; 425/150, 451, 541

[56] References Cited

U.S. PATENT DOCUMENTS

| | | | |
|---|---|---|---|
| 3,364,520 | 1/1968 | Hestehave | 18/5 |
| 3,390,427 | 7/1968 | Ruekberg | 18/5 |
| 3,441,982 | 5/1969 | Sagara et al. | 18/5 |
| 3,537,134 | 11/1970 | Raper et al. | 18/5 |
| 3,594,463 | 7/1971 | Hestehave | 264/97 |
| 3,754,068 | 8/1973 | Fattori | 264/97 |
| 3,767,341 | 10/1973 | Siebelhoff et al. | 425/541 |
| 3,804,573 | 4/1974 | Del Piero | 425/387 |
| 3,936,521 | 2/1976 | Pollock et al. | 264/98 |
| 3,985,485 | 10/1976 | Farrell | 425/242 |
| 4,028,042 | 6/1977 | Goodfellow et al. | 425/515 |
| 4,155,974 | 5/1979 | Valyi | 264/513 |
| 4,408,981 | 10/1983 | Brown | 425/589 |
| 4,421,472 | 12/1983 | Martin, Jr. | 425/527 |
| 4,427,359 | 1/1984 | Fukuoka et al. | 264/538 |
| 4,432,720 | 2/1984 | Wiatt et al. | 425/534 |
| 4,457,689 | 7/1984 | Aoki | 425/525 |
| 4,468,368 | 8/1984 | Hafele | 264/530 |
| 4,678,425 | 7/1987 | Gibbemeyer | 425/522 |
| 4,734,023 | 3/1988 | Nesch et al. | 425/130 |
| 4,747,769 | 5/1988 | Nakamura et al. | 425/529 |
| 4,818,213 | 4/1989 | Roy | 425/533 |
| 4,859,170 | 8/1989 | Aoki | 425/450 |
| 4,878,828 | 11/1989 | Wollschlager | 425/541 |
| 5,011,646 | 4/1991 | Bertschi | 264/297.2 |
| 5,037,597 | 8/1991 | McGinley et al. | 264/238 |
| 5,169,654 | 12/1992 | Koga | 264/523 |
| 5,261,809 | 11/1993 | Koga | 425/451.5 |

FOREIGN PATENT DOCUMENTS 60-96436   5/1985   Japan.

*Primary Examiner*—Catherine Timm

[57] ABSTRACT

First and second hollow bodies are blow molded in back-to-back alignment in a blow molding clamp having a central platen with first and second opposed, outwardly facing, mold supporting surfaces; a first movable platen with a mold supporting surface facing the first mold supporting surface of the central platen; and a second movable platen with a mold supporting surface facing the second mold supporting surface of the central platen; by continually extruding first and second parisons; positioning the first parison between the central platen and the first movable platen and the second parison between the central platen and the second movable platen; moving the movable platens to their closed position around the parisons; and simultaneously injecting a gas into the interior of the first and second parisons between each central platen and opposed first and second movable platens while the platens are in the closed position.

3 Claims, 7 Drawing Sheets

METHOD FOR BACK-TO-BACK BLOW MOLDING OF HOLLOW BODIES

This application is a division of application Ser. No. 252,685, filed Jun. 6, 1994, now U.S. Pat. No. 5,551,862.

BACKGROUND OF THE INVENTION

The present invention relates to blow molding apparatus used to mold hollow bodies from plastic material by blow molding, and especially to an apparatus for forming hollow bodies within two molds clamped in a back-to-back relationship.

In blow molding, a parison of plastic material is first extruded between two mold halves or sections, each having a back surface and a front surface, with a segment of the desired mold cavity cut into the surface of each section front surface. The opposed surfaces of the mold sections are positioned in parallel planes.

After extrusion of the parison, the mold segments are clamped together so that the front surfaces of the mold sections are held against each other to form the complete mold cavity, and air is injected into the interior of the parison, e.g., with a blowing needle, pin or other apparatus, which penetrates the parison wall. Injection of air into the interior of the parison expands the parison to conform to the shape of the mold cavity. After cooling, the mold is opened and the hollow body ejected.

A typical blow molding apparatus is comprised of one or more clamps. Each clamp supports the mold sections and includes an actuator means, such as toggles, hydraulic cylinders, or pneumatic cylinders, to move the mold sections between open and closed positions, and lock the sections in the closed position. An extrusion means, such as an extruder with an extrusion head, forms and introduces a parison between the mold sections at the proper point in the operation. A blowing needle, pin or other injection apparatus injects air into the interior of the parison while the clamps are closed to expand the walls of the parison into contact with the dies.

A representative prior art clamp comprises a pair of opposed platens supporting facing mold sections (dies). A toggle linkage, or other type of platen positioner means, is operated by some type of actuator to move the platens between open and closed positions along tie bars. The linkage also includes a locking means to lock the linkage and dies in the closed position. These basic elements, however, can be configured into different types of blow molding apparatus, depending upon the end result desired.

For example, a blow molding apparatus known as a continuous rotary blow molding apparatus is formed by positioning a plurality of outwardly facing mold clamps in a circle on a rotary support wheel, comprised of a pair of spaced vertically positioned disks. Upon rotation, each clamp, while in an open position, passes an extruder which extrudes a parison between spaced mold sections. Thereafter, the clamp, in response to some type of cam track or platen positioner, closes the mold sections around the parison. Alternatively, the clamp can be activated by pneumatic or hydraulic cylinders. An air injector, such as a blowing needle then injects air into the interior of the parison inside the mold cavity to expand the parison into a hollow body conforming to the interior shape of the mold cavity. The clamp then continues its rotation to cool the hollow body. After the hollow body is cooled, the mold clamp is opened and the hollow body ejected. Each clamp supported on the rotary wheel continues in sequence through these molding stages.

In another kind of blow molding apparatus, known as a shuttle molding apparatus, mold sections are supported in an open position in a single clamp which is moved back and forth between a molding station and a discharge station. The clamp is first moved to an extrusion or molding station where a parison of polymeric material is extruded between the mold segments. The mold segments are then clamped about the parison, air is injected into the parison to form the hollow body, and the clamp is then moved to a discharge station where the clamp is opened and the hollow body discharged. The clamp is then returned with the mold sections in an open position back to the extrusion station.

In the foregoing types of blow molding apparatus, as well as other types of blow molding apparatus known in the prior art, heavy clamping structures and high clamping pressures are required in order to squeeze and pinch the parisons during clamping, and withstand the internal pressures generated within the mold cavity during injection of air to form the hollow bodies. These pressures may be, for example, on the order of from about 40 to about 125 pounds per square inch. As a result of the high pressures required, the total surface area of the mold cavity, and thus the number or size of the items which can be formed during one molding cycle, is limited.

To increase capacity, it has heretofore been necessary to either utilize larger, multiple cavity, side-by-side molds, which have required heavier platens, heavier platen actuator means and greater forces, with consequently greater energy requirements, to move the heavier clamping mechanisms, or to utilize more molding apparatuses, which has required a duplication of all parts and increased energy due to the necessity of clamping and moving more molds.

Various types of blow molding apparatuses, and blow molding sections of injection blow molding apparatus, are described in the prior art. One of the earlier devices, described in U.S. Pat. No. 3,364,520 to Hestehave, is a rotary blow molding apparatus with a plurality of molds, each clamped between movable platens, which are opened and closed by toggle mechanisms in turn operable by hydraulic cylinders.

U.S. Pat. No. 3,936,521 to Pollock et al describes a rotary blow molding apparatus having a plurality of mold clamps spaced around a rotary table. In each clamp, a movable platen holding one mold segment is moved between open and closed positions relative to a second platen holding an opposed mold segment by a linkage assembly operated by a hydraulic cylinder.

In other devices, such as the rotary blow molding apparatus described in U.S. Pat. No. 3,985,485 to Farrell, and the blow molding section of the injection blow molding apparatus described in U.S. Pat. No. 4,818,213 to Roy, the movable platens are operated directly by hydraulic cylinders.

U.S. Pat. No. 4,457,689 to Aoki, U.S. Pat. No. 4,747,769 to Nakamura et al, and U.S. Pat. No. 4,859,170 to Aoki describe rotary injection stretching blow molding apparatus in which each mold station includes two radially spaced molds. The opposed segments of each mold are supported on movable platens which are moved together with hydraulic cylinders to close the mold.

In all prior art apparatus, however, an increase in capacity either requires the use of greater pressures, with a resulting need for heavier equipment and greater use of energy, or the use of a greater number of clamping stations. A blow molding apparatus which would permit molding of a greater surface area without increased pressures and energy expenditure, or the use of a greater number of clamping stations would be of great commercial utility.

SUMMARY OF THE INVENTION

One aspect of the present invention is to provide an improved blow molding apparatus and method which permits molding of twice the mold cavity surface area at a mold clamp station, using a common clamp and linkage and with no increase in pressure in each die or mold section. A particular aspect is an improved mold clamp for use in a blow molding apparatus which is capable of clamping twice the mold surface area of prior art clamps with no increase in pressure in each die cavity.

It has been found that the desired results can be achieved by utilizing a new and unique clamp which stacks two molds in back-to-back relationship. The clamp includes two spaced, movable outer platens and a central, substantially fixed central platen supporting a die cavity on each side thereof. An extrusion means extrudes a first parison between a first pair of die sections supported by the central platen and the first movable platen, and a second parison between a second pair of die sections supported by the central platen and the second movable platen. The extrusion means may have one of several configurations known in the relevant art. For example, the extrusion means may comprise a single extruder to melt and convey the plastic material, coupled with a dual extruder head, which forms the material into two parisons. Alternatively, the extrusion means may comprise two extruders, each connected to an extruder head which forms a single parison. Also, the blow mold apparatus includes injectors, such as blowing needles, adapted to inject a gas, e.g., air, into the interior of both parisons to effect blowing.

The improved clamp includes a central platen which has first and second, opposed, outwardly facing mold supporting surfaces to support an interior die of a first mold and an interior die of a second mold in a fixed, back-to-back relationship. A first movable platen Having a mold supporting surface facing the first mold supporting surface of the central platen. The exterior die of the first mold is secured to the supporting surface of the first movable platen so that the face of the exterior die will engage the face of the interior die when the clamp is in a closed position.

The clamp also includes a second movable platen having a mold supporting surface facing the second mold supporting surface of the central platen to support the exterior die of the second mold in position to engage the surface of the interior die held by the central platen when the clamp is closed. The central platen is positioned between the movable platens.

A platen positioner moves the first and second movable platens toward the central platen when closing the molds and away from the central platen when opening the molds. The platen positioner may comprise a linkage which includes a toggle mechanism which holds the dies in a closed, locked position during the molding stage. Alternatively, the platen positioner may comprise extendable rods, or other adjustment means, which are controlled by electrical, hydraulic, pneumatic, or mechanical devices, of the kinds previously disclosed in the art.

In order to ensure that both molds are subjected to equal pressure, the central platen is resiliently positioned by a platen retainer which allows the central platen to adjust to a limited extent toward either the first or second movable platen in response to unequal pressure or movement against the opposed mold supporting surfaces of the central platen.

In the drawings and description of the preferred embodiment which follows, the foregoing elements are described in the context of a rotary blow molding apparatus. It should be understood, however, that these elements can also form a part of other types of blow molding apparatus, and that the present invention is applicable to blow molding apparatus in general.

The present invention presents several commercial opportunities. First, as noted earlier, molds having twice the mold cavity surface area previously available at a given clamping are now possible without heavier linkage and clamping apparatus which would otherwise be necessary to squeeze and pinch the parisons, and withstand the increased pressures exerted internally during blowing. Alternatively, lighter weight, and less expensive blow molding apparatus can be used to mold a given mold surface area by using two molds in the back-to-back relationship described hereinbelow.

DESCRIPTION OF THE PREFERRED EMBODIMENT

Figure 1:
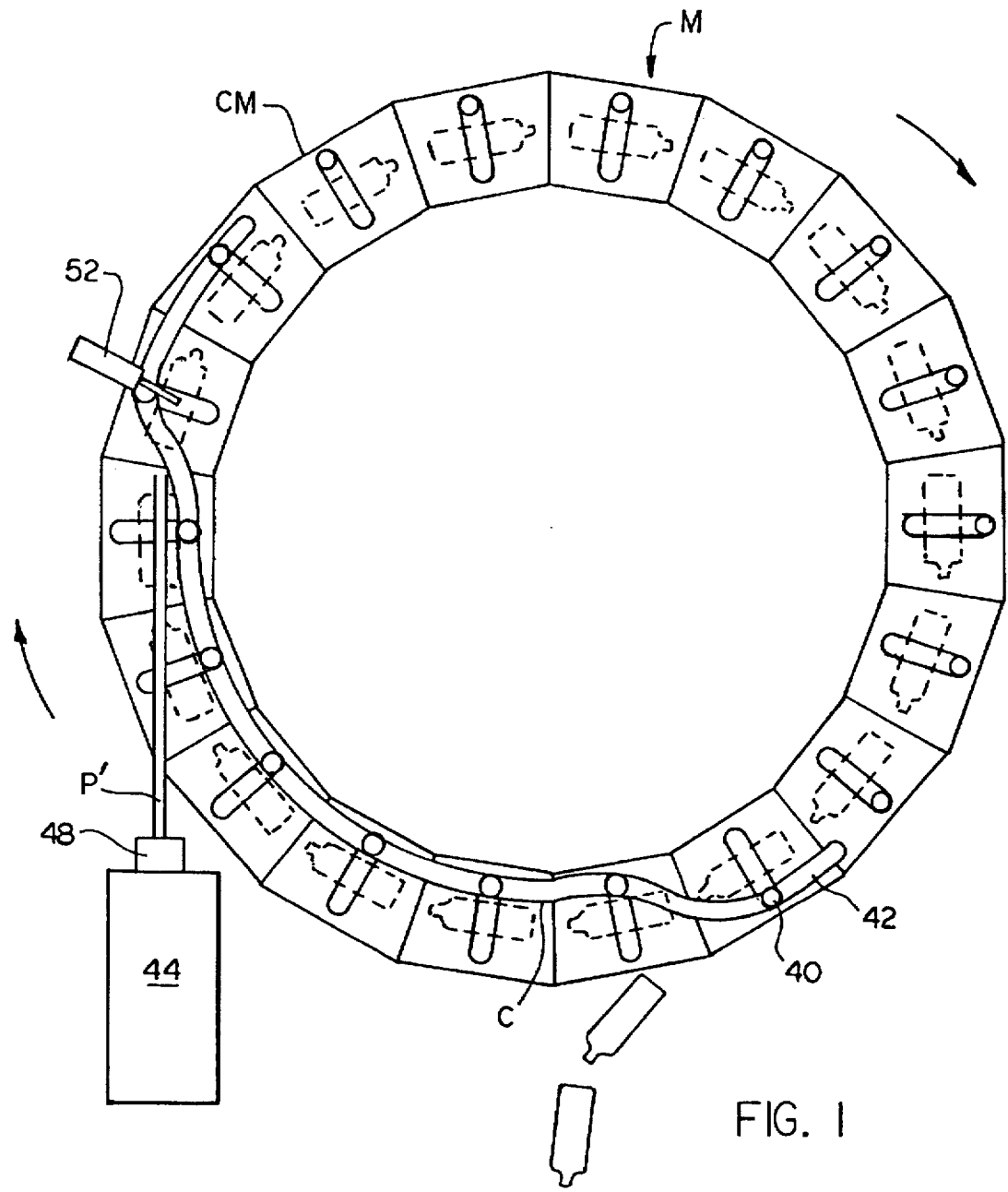
FIG. 1 is a diagrammatic or schematic side view of a rotary blow molding apparatus constructed in accordance with the present invention.
Figure 2:
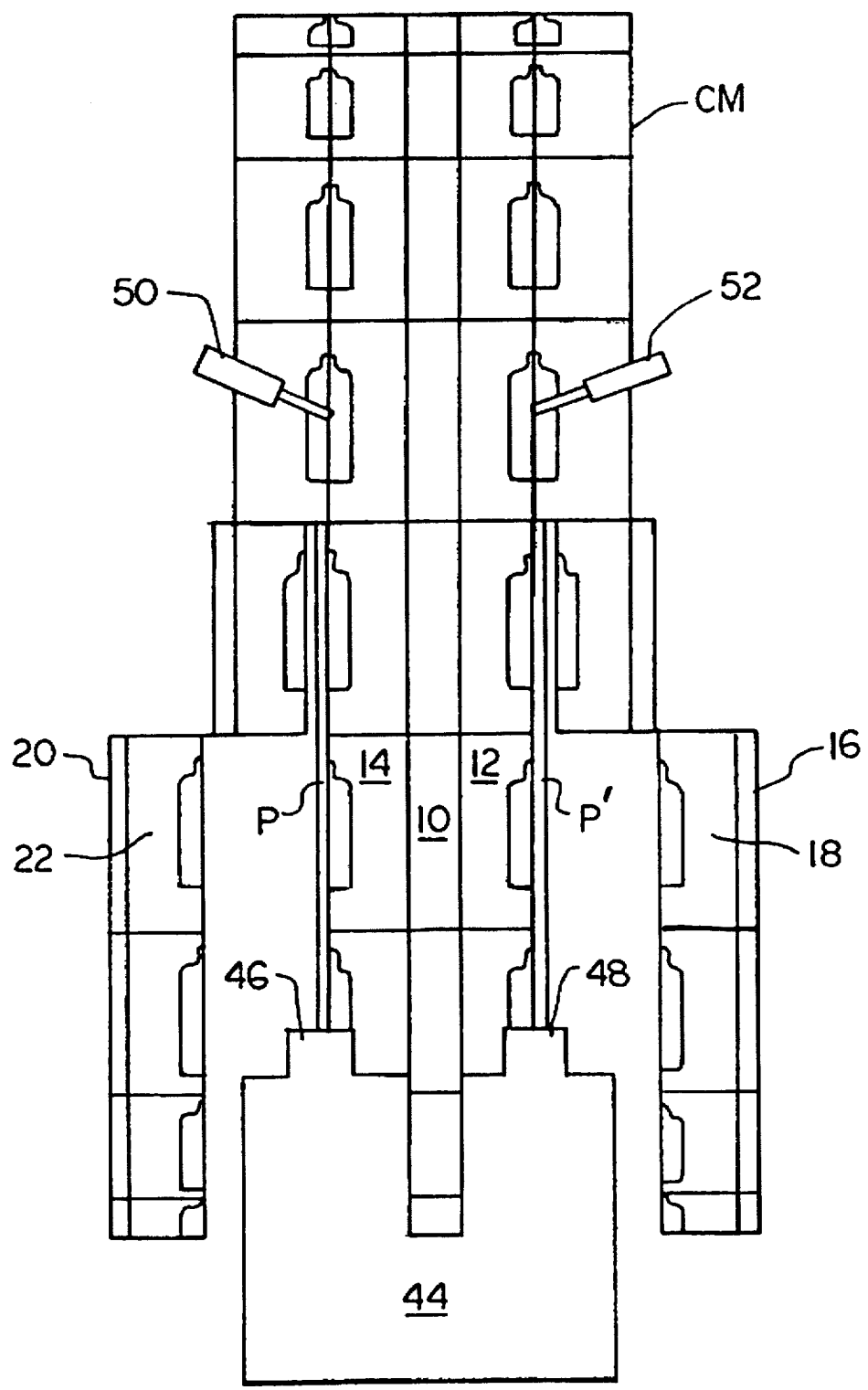
FIG. 2 is a schematic view of periphery of the rotary blow molding apparatus shown in FIG. 1.
Figure 3:
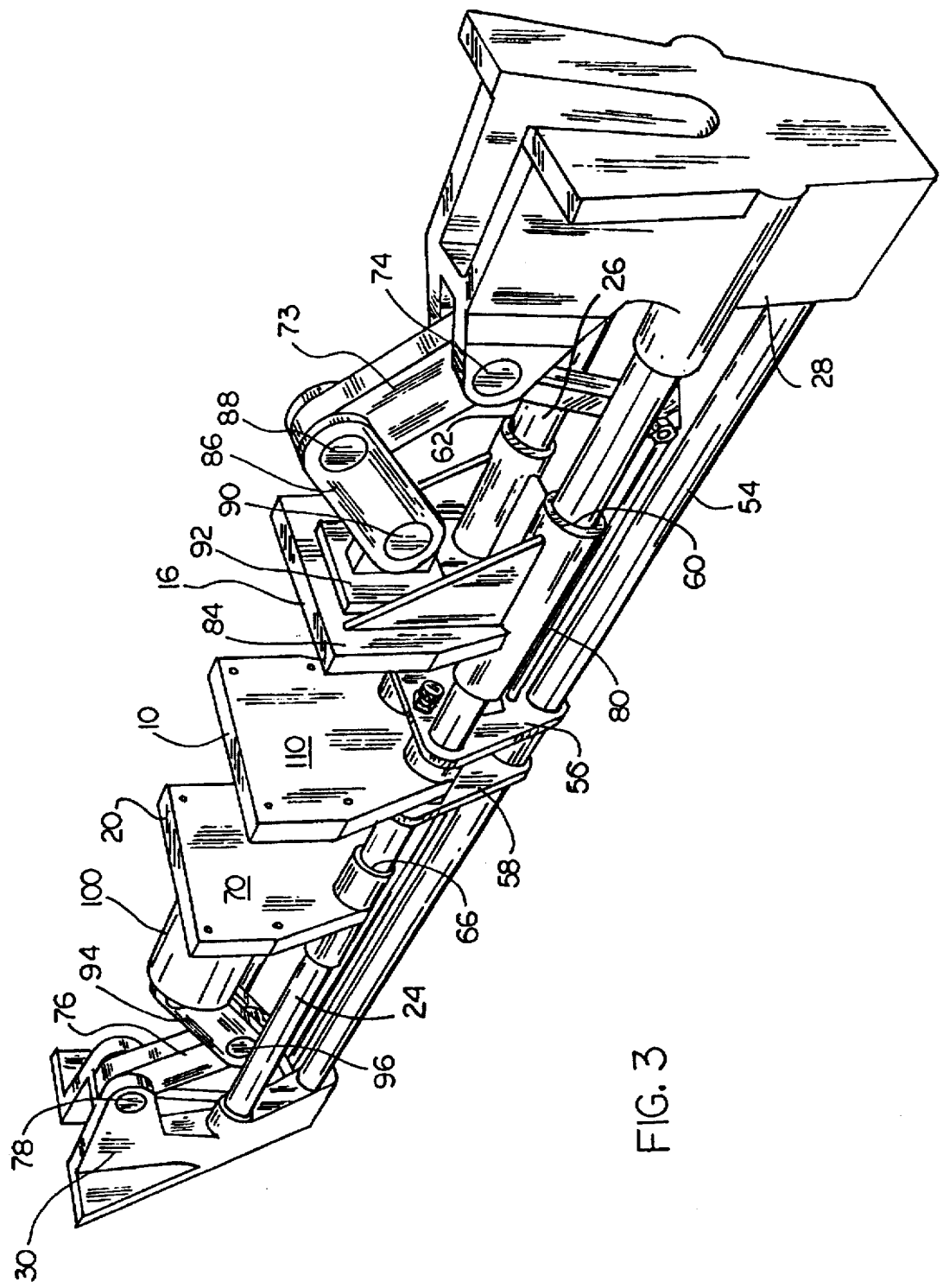
FIG. 3 is a perspective view of the blow mold clamp in an open position.
Figure 4:
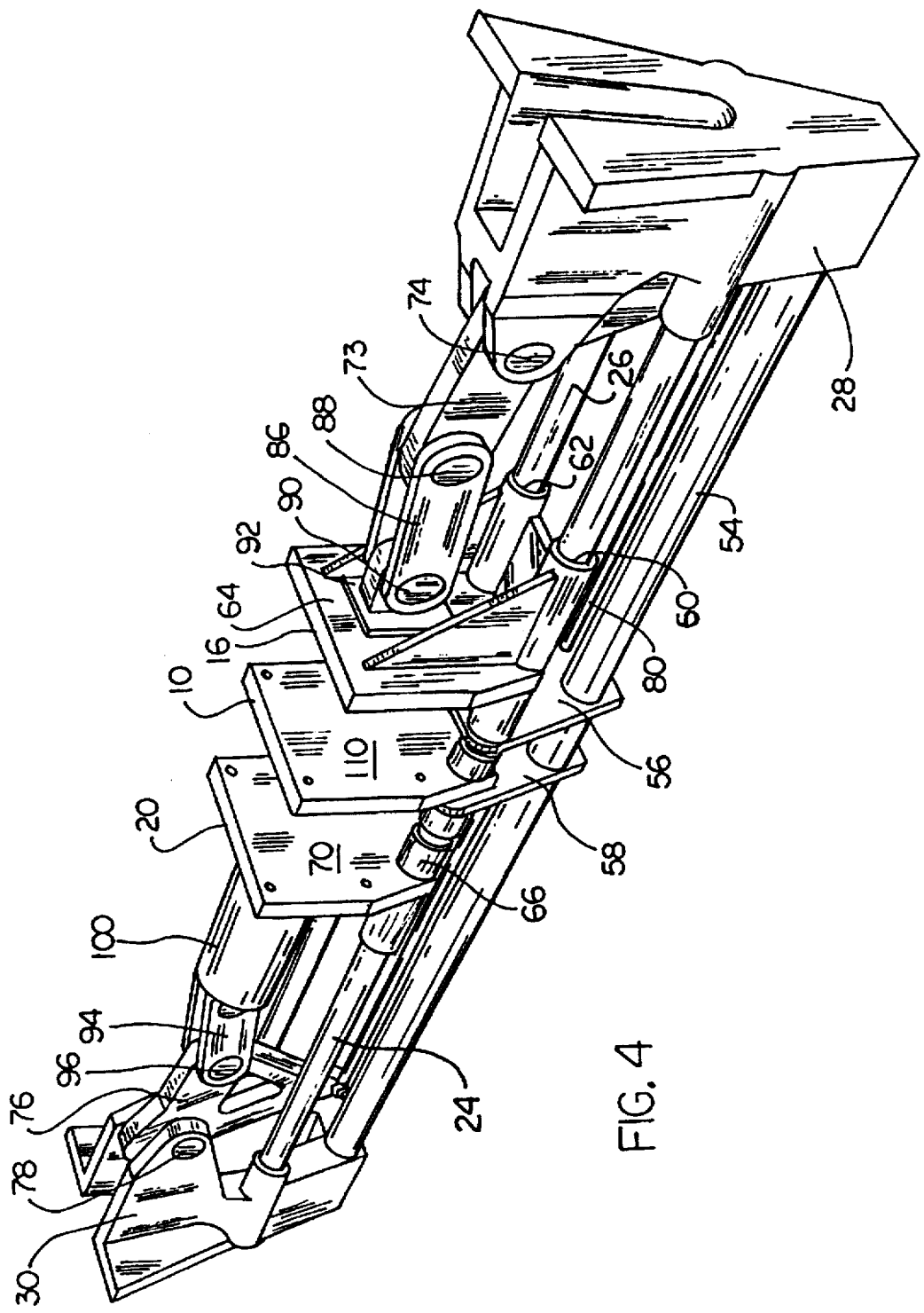
FIG. 4 is a perspective view of the blow mold clamp in a closed position.
Figure 5:
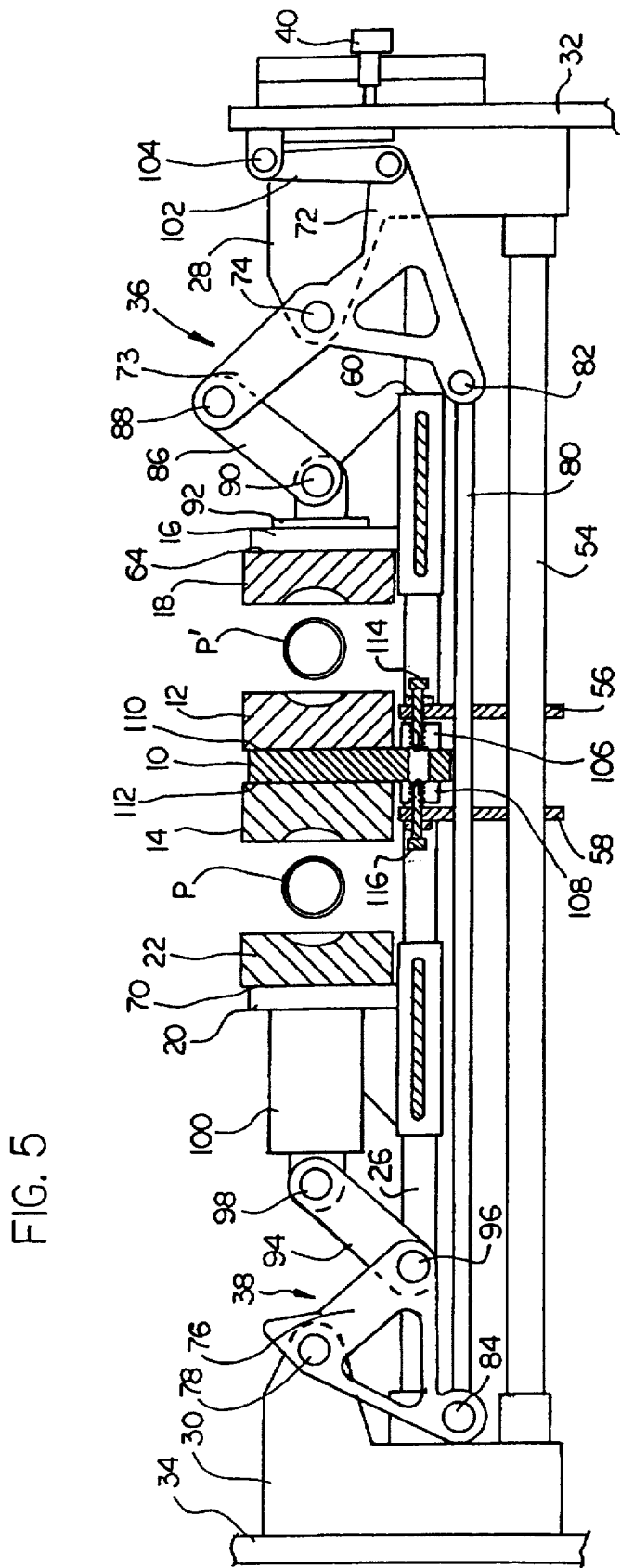
FIG. 5 is a schematic side view of the blow mold clamp in a open position with molds supported thereon.
Figure 6:
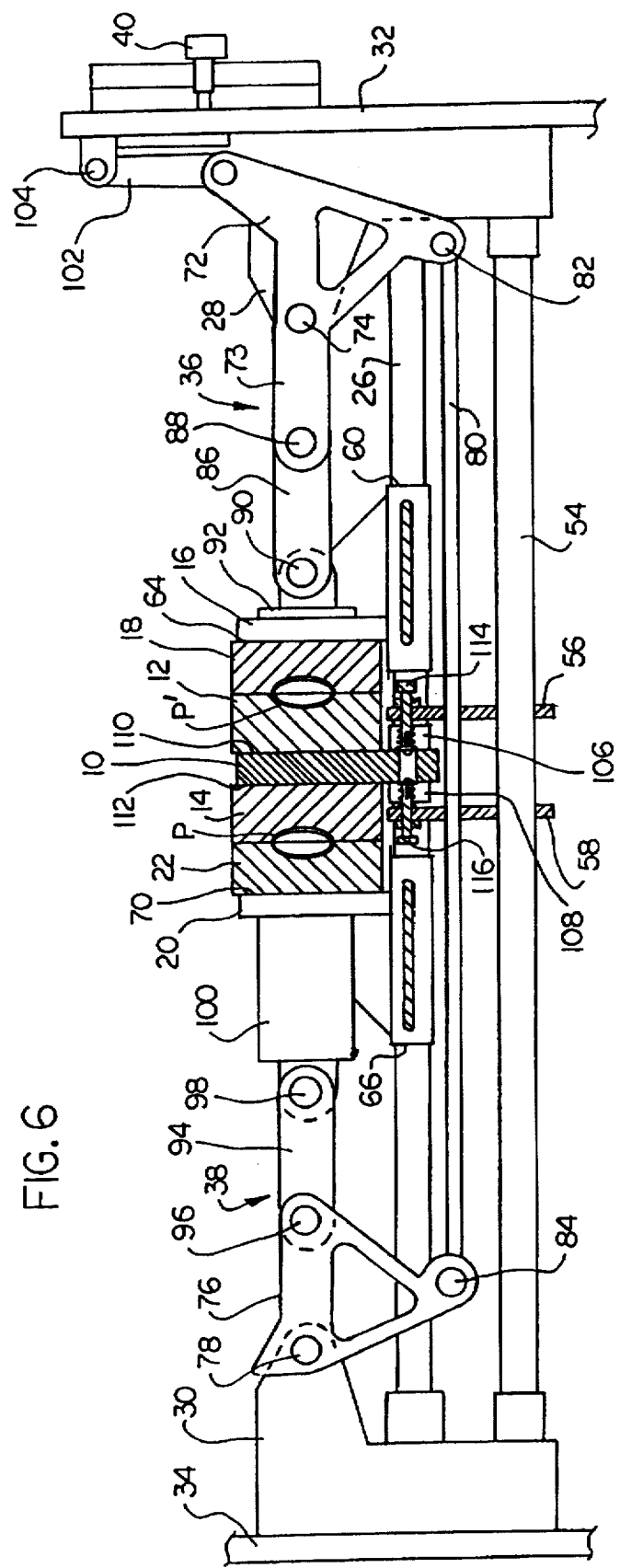
FIG. 6 is a schematic side view of the blow mold clamp in a closed position with molds supported thereon.

FIGS. 1 and 2 diagrammatically illustrate a rotary blow molding apparatus M showing placement of the back-to-back molds with the central and movable platens. It will be noted that the apparatus illustrated includes eighteen mold sets each containing two molds in back-to-back relation, or a total of thirty-six molds mounted on a Ferris wheel-like arrangement. Each mold is comprised of an exterior die half or section supported by a movable platen and an interior die half or section supported by the central platen. Each clamp supports two molds, each mold being comprised of an exterior section and an interior section. Since each clamp supported on the wheel is identical to the other clamps on the wheel, the ensuing description will describe one clamp, it being understood that the description is applicable to all of the other clamps. While the rotary apparatus, extruder head and blowing needle are conventional, the heart of the present invention lies in the unique clamp that carries back-to-back molds operated by a common positioner. Details of the dual clamp will be better understood by reference to FIGS. 3–8, it being understood that all other mold sets will be supported by identical clamps.

In FIG. 1 there is illustrated schematically a relatively conventional cam track or frame C. As the supporting Ferris wheel-like unit rotates, a cam follower associated with each clamp engages the cam track and is caused to move radially inwardly. The movement of the cam follower causes a resulting activation of the operating linkage of the corresponding clamp to unlock, open and discharge a molded article. After passing the discharge position and the parison extruder, the cam follower is moved in the opposite direction to close and lock the operating linkage. It should be recognized that use of the camming arrangement is representative only, and other clamp or linkage activating systems such as electrical, hydraulic and pneumatic activators are also envisioned.

As best seen schematically in FIGS. 1 and 2, each clamp and mold set CM in the rotary blow mold apparatus includes a central platen 10, which support the interior die sections 12 and 14 of first and second molds, respectively; a first movable platen 16 supporting the exterior die section 18 of the first mold; and a second movable platen 20 supporting the exterior die section 22 of the second mold.

Referring now to FIGS. 3-6, there is illustrated a clamp C representative of each clamp in the molding apparatus M. Central platen 10 and movable platens 16 and 20 are slidably supported on tie bars 24 and 26, which, in turn, are attached at their opposed ends to bolsters 28 and 30, which are mounted on a pair of parallel, rotatable support disks 32 and 34 which form part of the Ferris wheel-like rotating unit.

A first toggle linkage 36 connects bolster 28 to movable platen 16, while a second toggle linkage 38 likewise connects bolster 30 to movable platen 20. The toggle linkages 36 and 38, which will be described later in greater detail, serve to move platens 16 and 20 between open and closed positions.

Toggle linkage 36 is connected by a lever 72 and pivot arm 73 to a cam follower 40, which extends through a slot in the adjacent disk 32 of the apparatus frame. Upon rotation of the apparatus by a motor, not shown, cam follower 40 engages cam track 42, which extends generally horizontally alongside disk 32. Further rotation of disk 32 causes follower 40 to ride along cam track 42 and move radially inward. Follower 40 is attached to toggle linkage 36 through lever 72 and causes linkage 36 to move platen 16 to a open position. As will be detailed later, toggle linkage 36 is also attached to toggle linkage 38 by a draw bar 80, and simultaneously causes toggle linkage 38 to move platen 20 to the open position. Further rotation of disk 32 causes follower 40 to move radially outward, reversing the direction of toggle linkages 36 and 38, thus moving platens 16 and 20 to their closed position.

The blow mold apparatus also includes a dual head extruder 44 with heads 46 and 48 to extrude parisons P and P', respectively, between the exterior and interior sections of the first and second molds. Air is injected into the interior of the parisons P and P' with blow needles 50 and 52, respectively.

Figure 7:
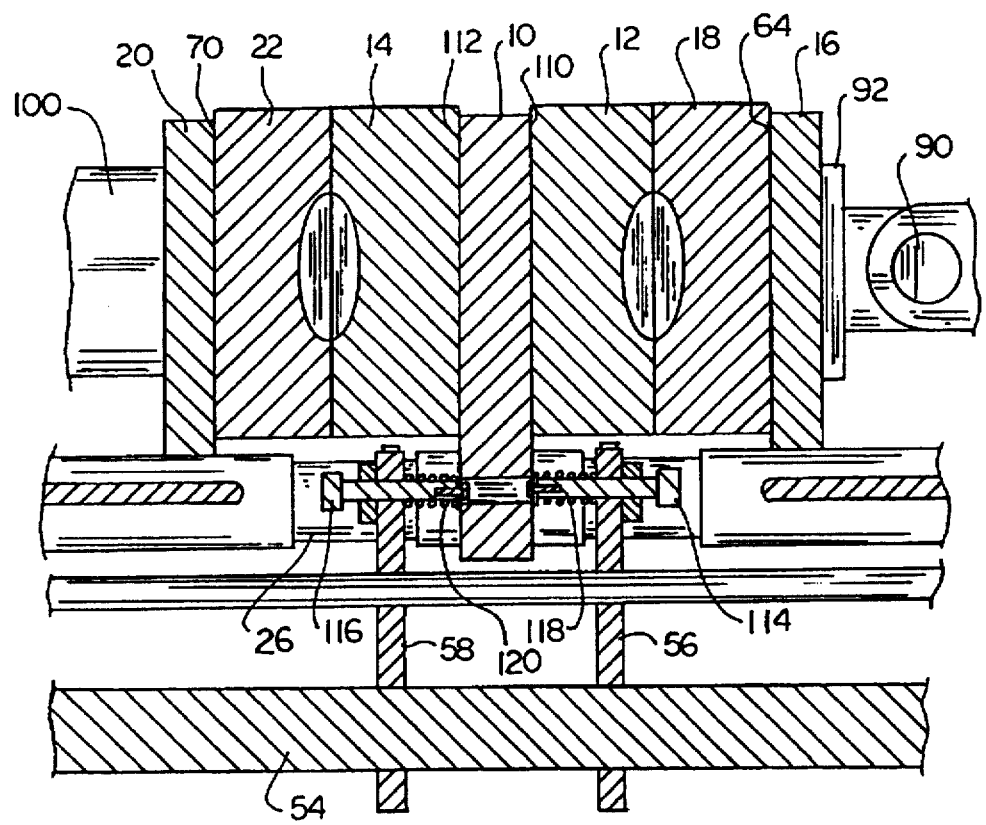
FIG. 7 is a detailed side view of the central platen and support mechanism.

The blow mold clamp of the present invention, as shown in particular in FIGS. 3-6, comprises a support disk which includes a pair of spaced bolsters 28 and 30, held in a fixed, spaced relationship by tie bars 24, 26 and 54, each of which has one end attached to bolster 28 and the opposite end attached to bolster 30. Tie bar 54 is a third reinforcing bar which extends between bolster 28 and 30 at a point below the parallel tie bars 24, 26. Central platen 10, while slidably supported on tie bars 24 and 26 to some extent for adjustability, is for the most part common to both molds and almost fixed. Retainer plates 56 and 58, described in greater detail in FIG. 7, are attached to tie bars 24, 26 and 54.

Tie bars 24 and 26 also support first movable platen 16, and second movable platen 20 which are slidable thereon between opened and closed positions. Movable platen 16 includes horizontal sleeves or bushings 60 and 62 to receive tie bars 24 and 26, and a vertical support surface 64 for supporting die section 18, which has its back surface attached to surface 64. The actual attachment means has not been illustrated, since various attachment means, e.g., bolts, are known in the prior art.

Similarly, movable platen 20 includes horizontal bushings 66 and 68 for receiving tie bars 24 and 26, and a vertical support surface 70 for supporting exterior die section 22 of the second mold.

The molds are opened and closed by a toggle linkage activated by the aforesaid cam frame. The toggle linkage includes a first pivot lever 72 which is pivotally attached to bolster 28 by pivot pin 74, and pivot lever 76 which is pivotally attached to bolster 30 by pivot pin 78. Each pivot lever is substantially a triangular member with pivoted attachment points at each apex. The pivot levers 72 and 76 are connected together at their lower ends with draw bar 80, which has one end pivotally attached to pivot lever 72 by pivot pin 82 and its opposed end pivotally attached to pivot lever 76 by pivot pin 84. Pivot lever 72 includes an arm 73 extending outwardly therefrom. Arm 73 is also pivotally attached to linking arm 86 by pivot pin 88. Linking arm 86 is, in turn, pivotally attached at its other end by pivot pin 90 to mounting bracket 92 which is secured to first movable platen 16. Pivot lever 76 is attached to linking arm 94 by pivot pin 96. Linking arm 94 is attached at its other end by pivot pin 98 to disk spring 100, which is attached to second movable platen 20.

Disk spring 100, which is comprised of a plurality of parallel, compressible plates or disks, is pre-set to the desired clamping force. After, the clamp is locked in the closed position, pressure on the clamps is exerted by disk spring 100, instead of by the toggle linkage, thus minimizing wear on the toggle linkage, while ensuring that the desired degree of force will be exerted.

Cam follower 40 is connected by linking arm 102 to pivot lever 72 with pivot pin 104. As noted earlier, rotation of disk 32 causes cam follower 40 to engage cam track 42, which causes cam follower 40 to move inwardly opening the molds, and then outwardly to close the molds. When the clamp is rotated, cam follower 40 first engages cam track 42. Movement of follower 40 inwardly rotates pivot lever 72, which is connected to linking arm 102, and also simultaneously rotates pivot lever 76 which is connected to pivot lever 72 by draw bar 80.

During clamping, the pressures exerted on the two molds, and thus on the opposite side of central platen 10 may differ as a result of the action of disk spring 100, as well as factors such as machining tolerances, parts wear, and machine adjustments. Differences in position may cause leakage from one of the molds during blowing, or could cause the central platen to break.

Therefore, it is an important aspect of the present invention to provide a way to resiliently retain platen 10 in a central position by permitting platen 10 to move a small distance in either direction between movable platens 16 and 20 in order to equalize pressure in the molds and on the opposed sides of platen 10. A movement of the platen in either direction of up to about 0.020 inch is generally sufficient. After pressure is withdrawn from platen 10, the retainer returns platen 10 to its original position.

Figure 8:
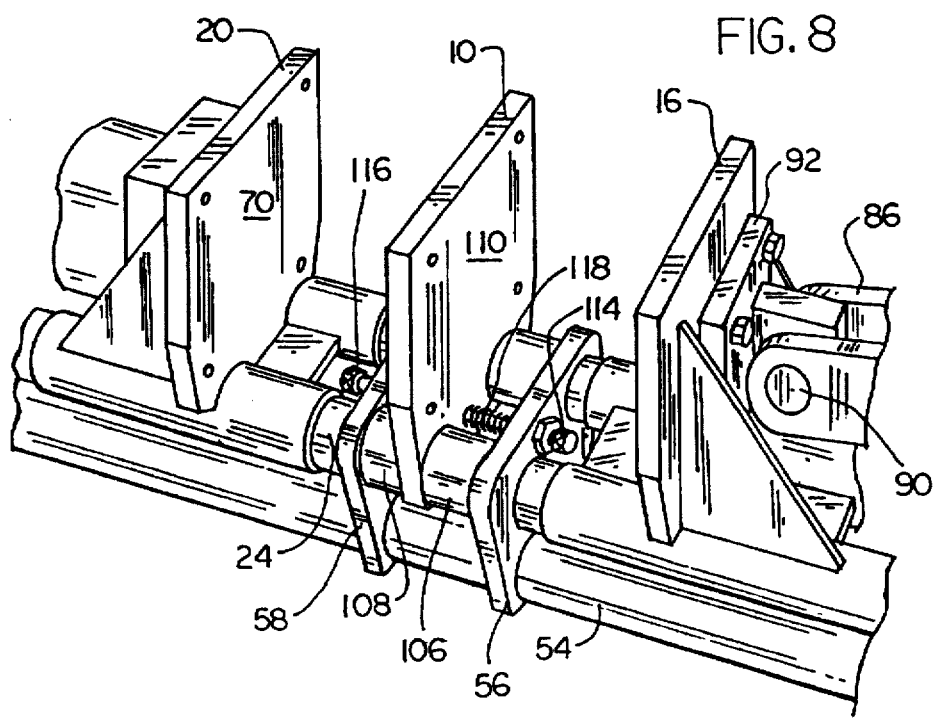
FIG. 8 is a perspective, detailed view of the central platen support mechanism.

FIGS. 7 and 8 provide a detailed view of central platen 10 and the central platen retainer. As shown, platen 10 includes horizontal bushings 106 and 108 which are slidably supported on tie bars 24 and 26, and opposed vertical support surfaces 110 and 112 for supporting interior die sections 12 and 14 in a back-to-back configuration. Die sections 12 and 14 are attached to platen 10 by bolting or other known means. The central platen retainer is comprised of a pair of vertical, spaced spreader plates 56 and 58 which are securely clamped to tie bars 24, 26 and 54, and slightly spaced, from opposed ends of platen 10. A pair of set screws 114 and 116 are threaded through plates 56 and 58, respectively, and into abutting contact with opposed sides of platen 10. A spring 118 is positioned around screw 114 to urge platen 10 away from plate 56. Similarly, a spring 120 is positioned around screw 116 to urge platen 20 away from plate 58. In centering platen 10, plates 56 and 58 are moved along tie bars 24, 26 and 54 until platen 10 is approximately centered. Plates 56 and 58 are then securely bolted to bars 24, 26 and 54, and set screws 114 and 116 are used to center the platen.

In operation, interior sections 12 and 14 of a pair of molds are attached in a fixed, back-to-back relationship to central platen 10. The molds' exterior sections, 18 and 22 are attached to movable platens 16 and 20, respectively. Parisons P and P' are extruded from heads 46 and 48 of dual head extruder 44 between the exterior and interior mold sections of each mold.

The molds are then closed by actuating the toggle assembly to simultaneously move platens 16 and 20 toward platen 10 until interior mold section 12 abuts against an exterior mold section 18, and interior mold section 14 abuts against an exterior mold section 22, and a predetermined pressure is exerted against each mold. Complete rotation of the toggle assembly to the position shown in FIG. 4 locks the toggle assembly and holds the molds in a securely locked configuration. If the movement of one mold is greater than the movement of the other mold, then platen 10 will move away from the mold upon which the greater movement occurs until the platen is centered.

After the molds are closed and locked, air is injected through blow needles 50 and 52 into the interior of parisons P and P', respectively, to expand the parisons to conform to the shape of the mold cavities. The hollow bodies thus formed are then cooled to maintain their shape, the molds are opened by retracting platens 16 and 20 away from platen 10, and the bodies are ejected.

The force required to hold mold sections together during the blowing stage must be sufficient to squeeze and pinch the parison and prevent the internal blowing pressure from causing parison blow-out and leakage from the mold. The pressure required will depend on the surface area of the mold cavity at the mold face, the type of plastic used, and the thickness of the parison wall. Generally, however, a pressure of from about 40 to about 125 p.s.i. is used for blow molding. Thus, a mold with a surface area of 30 square inches would require a total pressure against the mold of 1,200–3,750 pounds. In contrast, it has been found that the pressure, with other conditions being equal, can remain the same, or nearly the same, when molds are placed in a back-to-back relationship as described above. Or, it is possible to place two molds, each having a surface area of 30 square inches in a back-to-back configuration as taught herein and carry out blow molding with no increase in pressure over molding with a single mold using prior art apparatus and methods. Thus, one can effectively reduce the pressure requirements for each die cavity by one-half, or double the molding capacity at no increase in clamp pressure requirements for each cavity, by the present invention.

Certain modifications and improvements will occur to those skilled in the art upon a reading of the foregoing description. By way of example, hydraulic cylinders can be used to open and close the platens. Also, different types of adjusters can be used to support the central platen. The apparatus, while illustrated with molds of the same size, can also be used to clamp two molds of different sizes in a fixed, back-to-back relationship. It should be understood that all such modifications and improvements have been deleted herein for the sake of conciseness and readability but are properly within the scope of the following claims.

What is claimed is:

1. A method for blow molding first and second hollow bodies in two molds, each mold having an inner mold section and an outer mold section, with said inner mold sections being in back-to-back alignment in a blow molding apparatus comprising:

(a) providing a resiliently mounted central platen supporting first and second opposed, outwardly facing inner mold sections;

(b) providing a first movable platen supporting a first outer mold section facing the first inner mold section;

(c) providing a second movable platen supporting a second outer mold section facing the second inner mold section;

(d) continuously extruding first and second parison along parallel pathways;

(e) simultaneously moving said first and second movable platens relative to said central platen between a first open position and a second closed and locked position while said first parison is between said first inner mold section and said first outer mold section and said second parison is between said second inner mold section and said second outer mold section;

(f) simultaneously injecting gas into the interiors of said first and second parisons between each central platen and opposed first and second movable platens while said moveable platens are in said closed position thereby blow molding said parisons; and (g) resiliently positioning said central platen to equalize clamping pressure in said molds when said movable platens are moved to said closed position, whereby said central platen adjusts in response to unequal pressure when said movable platens are moved to said closed position.

2. A method for blow molding first and second hollow bodies in two molds, each mold having an inner mold section and an outer mold section, with said inner mold sections being in back-to-back alignment in a blow molding apparatus comprising:

(a) providing a plurality of mold clamps, each clamp having a central platen supporting first and second opposed, outwardly facing inner mold sections; a first movable platen supporting a first outer mold section facing the first inner mold section; a second movable platen supporting a second outer mold section facing the second inner mold section; and a platen positioner to move said movable platens between an open position away from said central platen and a closed position approaching said central platen;

(b) continually extruding a first parison between said central platen and said first movable platen and a second parison between said central platen and said second movable platen on each of said clamps as said clamps sequentially pass said parisons;

(c) sequentially moving said clamps past said parisons to position said first parison between said first inner mold section and said first first outer mold section and said second parison between said second inner mold section and said second outer mold section as each of said clamps sequentially passes said parisons;

(d) moving said movable platens to said closed position around said parisons; and (e) injecting a gas into the interior of said first and second parisons simultaneously to blow mold said parisons in said molds while said clamps are in said closed position.

3. The method of claim 2, including resiliently positioning said central platen, whereby said central platen adjusts in response to unequal pressure when said movable platens are moved to said closed position.

* * * * *